M. JENSEN.
FRUIT GATHERER.
APPLICATION FILED JULY 8, 1912.
1,058,241.
Patented Apr. 8, 1913.
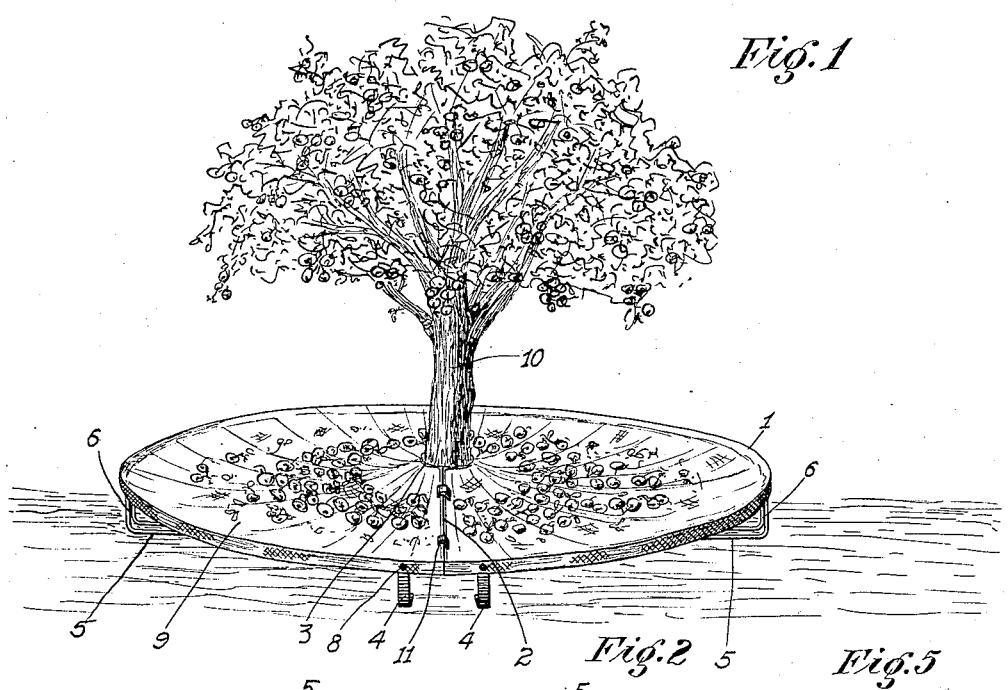
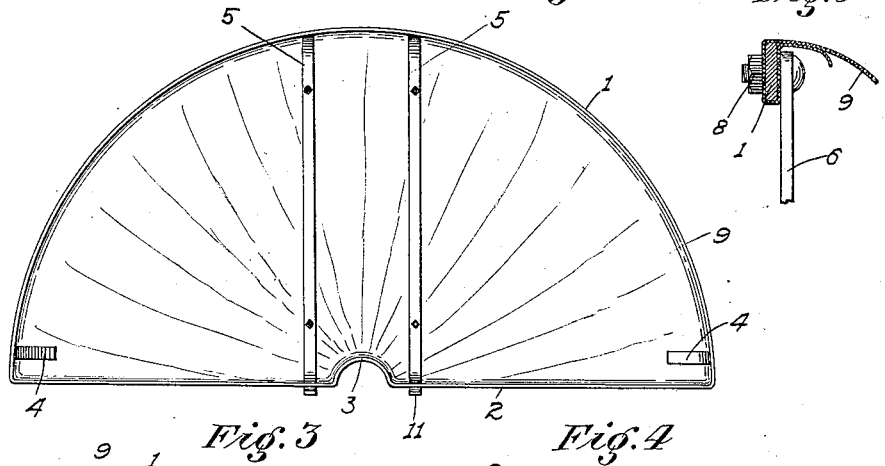
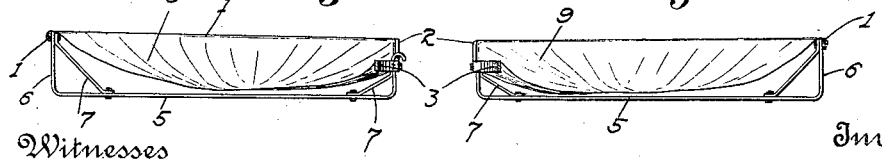
Witnesses
Inventor
Martin Jensen
By
Percy S. Webster
Attorney

UNITED STATES PATENT OFFICE.

MARTIN JENSEN, OF FOWLER, CALIFORNIA.

FRUIT-GATHERER.

1,058,241. Specification of Letters Patent. Patented Apr. 8, 1913.

Application filed July 8, 1912. Serial No. 708,182.

*To all whom it may concern:*

Be it known that I, MARTIN JENSEN, a citizen of the United States, residing at Fowler, in the county of Fresno, State of California, have invented certain new and useful Improvements in Fruit-Gatherers; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in fruit gatherers for orchards or the like, the object of the invention being to produce a gatherer which will be placed under the tree and the fruit secured therein and then emptied from the same, such gatherer comprising a basket like structure made in two halves and adapted to encircle the tree, such halves to be joined together when in position.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claim.

On the drawings, similar characters of reference indicate corresponding parts in the several views.

Figure 1 is a perspective view of the complete device. Fig. 2 is a bottom plan view of one of the halves of the basket. Figs. 3 and 4 are sectional views of one of the halves of the basket. Fig. 5 is a fragmentary view partly in section showing the method of fastening the canvas on the basket.

Referring now more particularly to the characters of reference on the drawings, each half of the basket comprises a semi-circular upper ring or bar 1 having a cross bar 2 disposed across its free ends in a diametrical manner, such member 2 having a central bent portion 3 forming a recess. Each outer end of the member 1 is provided with a supporting foot member comprising an angle iron 4 and disposed across from the member 2 on each side of the portion 3 and to the outer circumference of the member 1 are two supporting bars 5 having upwardly projecting portions 6 connecting with the members 1 and 2 there being suitable brace members 7 disposed across each of the corners of the members 5 and 6.

The members 4 and 6 are bolted to the member 1 by means of bolts 8 and in practice canvas 9 is stretched across the members 1 and 2 and around the same and such canvas is held in position by the bolts 8 as shown in Fig. 5.

In practice the halves are disposed around the tree 10 by reason of the recesses formed by the members 3 which brings the members 2 together in a line and they are then joined together by means of hooks 11 disposed alternately on the adjacent members 2 and adapted to hook into their adjacent members. The fruit is then shaken from the tree 10 and falls upon the canvas 9 from where it can be gathered and hence it can be readily seen that by unhooking one of the halves from the other, then the fruit can be readily emptied and the parts carried to another tree and placed in position.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

A device of the character described comprising a basket consisting of two halves, each half comprising an outer semi-circular ring, a cross bar disposed diametrically across the free ends of said ring, such cross bar being provided with a central bent portion forming a recess, an angle shaped foot member bolted to the outer ends of said semi-circular ring, a cross bar disposed from said first named cross bar to said semi-circular ring on each side of said bent portion, said last named cross bars having vertical members bolted to said ring and said first named cross bar, a canvas stretched across said ring and said first named cross bar and wrapped around the same, said bolts passing through said canvas, as described.

In testimony whereof I affix my signature in presence of two witnesses.

MARTIN JENSEN.

Witnesses:
G. W. CARTWRIGHT,
D. A. COSLEIN.

Copies of this patent may be obtained for five cents each, by addressing the "Commissioner of Patents, Washington, D. C."